(No Model.)
G. A. HUFF.
SNAP HOOK.
No. 346,047. Patented July 20, 1886.
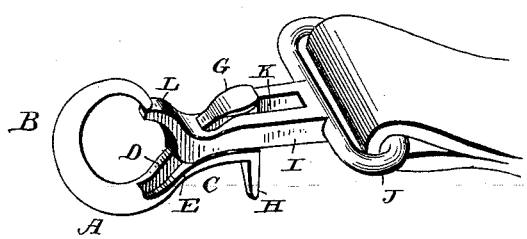
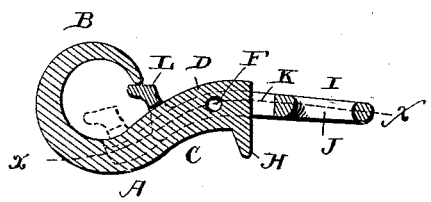
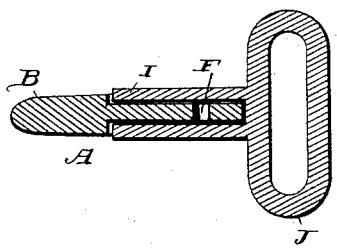
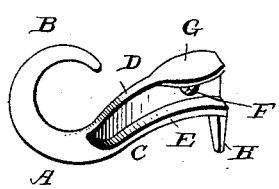
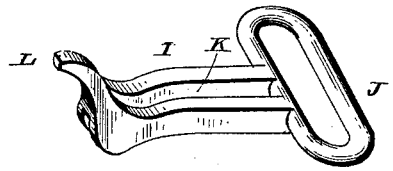
WITNESSES
C. H. Ourand
Edward Stanton
INVENTOR
George A. Huff
By Louis Bagger & Co.
Attorneys.

UNITED STATES PATENT OFFICE.

GEORGE A. HUFF, OF CHAMPAIGN, ILLINOIS.

SNAP-HOOK.

SPECIFICATION forming part of Letters Patent No. 346,047, dated July 20, 1886.

Application filed January 19, 1886. Serial No. 189,065. (No model.)

*To all whom it may concern:*

Be it known that I, GEORGE A. HUFF, a citizen of the United States, and a resident of Champaign, in the county of Champaign and State of Illinois, have invented certain new and useful Improvements in Snap-Hooks; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved snap-hook. Fig. 2 is a longitudinal sectional view of the same. Fig. 3 is a longitudinal section on line $x$ $x$, Fig. 2; and Fig. 4 is a perspective view of the parts of the hook separated.

Similar letters of reference indicate corresponding parts in all the figures.

My invention has relation to snap-hooks; and it consists in the improved construction and combination of parts of a snap-hook, in which the movable lip of the hook is held in position, closing the hook by the gravity of the strap or chain attached to the loop of the hook, as hereinafter more fully described and claimed.

In the accompanying drawings, the letter A indicates the body of the hook, which body consists of the hook B proper, and of the curved shank C, the upper portion, D, of which is reduced to form a flange or ridge having laterally-projecting flanges E at its lower edge. The inner end of this ridge is formed with a transverse perforation, F, and the upper edge of the ridge is formed with a laterally-projecting cross-piece, G, having its ends projecting at both sides of the ridge. The inner end of the hook portion is provided with a finger-piece, H, projecting downward, against which piece the fingers of the person hooking or unhooking the snap-hook may bear.

I is the latch, which is provided at its inner end with a loop, J, for the attachment of the strap, chain, or rope to which the hook is to be attached, and the shank of this latch is formed with a longitudinal slot, K, and is curved to correspond to the curve of the shank of the body of the hook. The slotted shank fits and slides upon the curved ridge of the shank of the body of the hook, and is retained by means of the cross-piece upon the ridge, and the outer end of the latch is formed with an upwardly-curved horn, L, which may bear against the end of the hook. It will be seen that when the latch is pushed with its horn into the inner portion of the hook, the said hook may engage a ring or other open object, and that the weight of the object to which the loop of the latch is attached will draw the latch to bring its horn to bear against the end of the hook, closing the hook so that the hook cannot be disengaged from its ring without pushing the latch toward the hook, while any strain upon the loop of the latch, either by the weight of the object to which the latch is attached or by force exerted upon the said object or upon the hook, the latch will have its horn forced against the end of the hook, and thus close the hook more effectually.

Although I prefer to have the shank of the hook curved, as shown, so that the lip L will pass down into the curve of the hook, as shown in dotted line in Fig. 2, so as to permit a larger ring to pass into and out of it than if it were straight.

Having thus described my invention, I claim and desire to secure by Letters Patent of the United States—

1. A hook consisting of a hook portion and a latch portion, said latch being provided with a lip or horn at one end and a loop at the other, and the intermediate portion of which is longitudinally slotted, the body portion of said hook being provided with lateral grooves in which the arms of the shank or loop portion are fitted, and in which they are adapted to slide, as shown and described.

2. A hook consisting of a hook portion and a latch portion, said latch portion being provided with a lip or horn at one end and a loop at the other, and the intermediate portion of which is longitudinally slotted, said hook being provided at one end with a projection or finger-piece, and being provided in its body portion with lateral grooves, in which the shank or loop portion is fitted, and in which it is adapted to slide, as shown and described.

In testimony that I claim the foregoing as my own I have hereunto affixed my signature in presence of two witnesses.

GEORGE A. HUFF.

Witnesses:
L. DAWSON,
SOLON PHILBRICK.